UNITED STATES PATENT OFFICE.

WALTER J. BUDINGTON, OF PITTSFIELD, MASSACHUSETTS.

MANUFACTURE OF HYDRAULIC CEMENT.

SPECIFICATION forming part of Letters Patent No. 245,699, dated August 16, 1881.

Application filed July 11, 1881. (No specimens.)

*To all whom it may concern:*

Be it known that I, WALTER J. BUDINGTON, a citizen of the United States of America, residing at Pittsfield, in the county of Berkshire and State of Massachusetts, have invented certain new and useful Improvements in the Manufacture of Hydraulic Cement; and I do hereby declare the following to be a full, clear, and exact description of the invention, such as will enable others skilled in the art to which it appertains to make and use the same.

The nature of my invention consists in a compound of Portland or hydraulic cement, and in the method for making the same, as will be hereinafter more fully set forth.

My cement is made from white marble of the second formation and a peculiar blue clay, which latter is found in abundance along the Hudson river, in the State of New York, likewise in the county of Berkshire, State of Massachusetts. The stone is of white marble of the second formation, found in abundance in the county of Berkshire, State of Massachusetts, and elsewhere.

The proportions of the white marble and clay used in forming my cement are preferably as follows, to wit: For the first grade of cement, seventy-eight per cent. of stone and twenty-two per cent. of clay; for the second grade, seventy-six per cent. of stone and twenty-four per cent. of clay; for the third grade, seventy-five per cent. of stone and twenty-five per cent. of clay; and for the fourth grade, seventy-four per cent. of stone and twenty-six per cent. of clay.

It is obvious that the grades of cement may be increased indefinitely by the use of relative proportions of the stone and clay; but it is anticipated that the second and third grades will be generally used.

The white marble is reduced by suitable machinery to an impalpable powder, and the clay is also reduced in like manner. The powered marble and clay are then intimately mixed, first being weighed, and of the desired proportions, after which water is added in sufficient quantity to make a rather stiff paste. The mass is then molded into bricks by suitable machinery, or into any other desired form. The bricks or molded mass is placed in a dry-kiln, from which they are passed into a burning-kiln having a blower attached to produce a blast. Then by continuous burning I produce for market the cement, it having been heated sufficiently to produce semi-vitrification.

The cement thus produced I have found by experiment to be superior to the best imported Portland cement, and can be sold much cheaper.

What I claim as new, and desire to secure by Letters Patent, is—

A cement made of white marble of the second formation and blue clay, mixed in the proportions and in the manner herein set forth.

In testimony whereof I affix my signature in presence of two witnesses.

WALTER J. BUDINGTON.

Witnesses:
GEORGE Y. LARNED,
THOS. A. OMAN.